(12) United States Patent
Logan et al.

(10) Patent No.: US 11,214,014 B2
(45) Date of Patent: Jan. 4, 2022

(54) COMPOSITE REINFORCEMENT

(71) Applicant: ROLLS-ROYCE plc, London (GB)

(72) Inventors: Oliver J. Logan, Tiptree (GB); Yusuf S. Mahadik, Bristol (GB); Stephen Hallett, Bristol (GB)

(73) Assignee: Rolls-Royce PLC, London (GB)

( * ) Notice: Subject to any disclaimer, the term of this patent is extended or adjusted under 35 U.S.C. 154(b) by 93 days.

(21) Appl. No.: 16/688,363

(22) Filed: Nov. 19, 2019

(65) Prior Publication Data
US 2020/0171757 A1 Jun. 4, 2020

(30) Foreign Application Priority Data
Dec. 4, 2018 (GB) ...................... 1819769

(51) Int. Cl.
*B29C 65/56* (2006.01)
*B29C 65/00* (2006.01)
(Continued)

(52) U.S. Cl.
CPC ...... *B29C 65/562* (2013.01); *B29C 66/02242* (2013.01); *B29C 66/836* (2013.01);
(Continued)

(58) Field of Classification Search
CPC ..... B29C 65/562; B29C 65/564; B29C 65/60; B29C 65/601; B29C 66/02242; B29C 66/836; B29C 66/8322; B29C 66/8324; B29C 66/847; B29C 70/543; B29C 70/545; B29C 70/24; B29C 70/023; B29L 2009/00
USPC ......... 156/60, 72, 91, 92, 94, 250, 252, 253, 156/293, 297, 298, 349, 510, 513, 514, 156/516, 523, 538, 539, 556, 559, 560,
(Continued)

(56) References Cited

U.S. PATENT DOCUMENTS 5,167,360 A * 12/1992 Ritter ................... B21F 27/128
227/69
5,231,747 A 8/1993 Clark et al.
(Continued)

FOREIGN PATENT DOCUMENTS

| EP | 1707702 | 10/2006 |
|---|---|---|
| GB | 1480140 | 7/1977 |
| WO | 2011135267 | 11/2011 |

OTHER PUBLICATIONS

Great Britain search report dated May 20, 2019, issued in GB Patent Application No. 1819769.9.
(Continued)

*Primary Examiner* — Philip C Tucker
*Assistant Examiner* — Brian R Slawski
(74) *Attorney, Agent, or Firm* — Shumaker & Sieffert, P.A.

(57) ABSTRACT

The present disclosure concerns apparatus and methods for reinforcing composite materials by insertion of reinforcement pins. Example embodiments include an apparatus for reinforcing a composite preform, comprising: a carriage for introducing reinforcement pins into the composite preform, the carriage comprising a drill module, a pin feeder module and a tamper module, the assembly being translatable relative to the composite preform, wherein the drill module and pin feeder module are exchangeable between a common actuation position on the carriage.

19 Claims, 5 Drawing Sheets

(51) Int. Cl.
  *B29L 9/00* (2006.01)
  *B29C 70/54* (2006.01)
(52) U.S. Cl.
  CPC ...... *B29C 66/8322* (2013.01); *B29C 66/8324* (2013.01); *B29C 66/847* (2013.01); *B29C 70/545* (2013.01); *B29L 2009/00* (2013.01)
(58) Field of Classification Search
  USPC .......... 156/562, 566, 574; 227/81, 107, 110, 227/111, 112, 119, 139, 79, 80, 140, 148
  See application file for complete search history.

(56) References Cited

U.S. PATENT DOCUMENTS

| | | | |
|---|---|---|---|
| 5,536,344 A | 7/1996 | van Dreumel | |
| 2015/0291273 A1* | 10/2015 | Elze | B32B 37/06 244/120 |
| 2016/0052198 A1 | 2/2016 | Fischer et al. | |
| 2016/0251807 A1 | 9/2016 | Hawkins et al. | |

OTHER PUBLICATIONS

European search report dated Apr. 17, 2020, issued in EP Patent Application No. 19207995.
Response to Extended European Search Report from counterpart EP Application No. 19207995.2 dated April 28, 2020, filed Jun. 18, 2020, 28 pgs.

* cited by examiner

COMPOSITE REINFORCEMENT

CROSS-REFERENCE TO RELATED APPLICATIONS

This specification is based upon and claims the benefit of priority from UK Patent Application Number 1819769.9 filed on Dec. 4, 2018, the entire contents of which are incorporated herein by reference.

BACKGROUND

Technical Field

The present disclosure concerns apparatus and methods for reinforcing composite materials by insertion of reinforcement pins.

Description of the Related Art

Insertion of reinforcement pins, commonly known as z-pins, is a way of reinforcing composite laminates to reduce the risk of delamination by adding through-thickness strength. Insertion of a reinforcement pin commonly involves a three-step process using a machine of the type illustrated in FIG. 1.

SUMMARY

According to a first aspect there is provided an apparatus for reinforcing a composite preform, comprising:

a carriage for introducing reinforcement pins into the composite preform, the carriage comprising a drill module, a pin feeder module and a tamper module, the carriage being translatable relative to the composite preform, wherein the drill module and pin feeder module are exchangeable between a common actuation position on the carriage.

The apparatus may further comprise a workpiece holder for holding the composite preform. In some examples, however, a workpiece holder may not be required, for example when introducing reinforcement pins into a large composite preform, in which case the apparatus may be positioned relative to the composite preform without the need for additional support. In other cases the composite preform may just need to be held in place to resist the forces applied by the drill, pin feed and tamper modules to prevent the composite preform from moving.

Exchanging the modules between a common actuation position allows for a smaller footprint for the carriage in relation to the composite preform, enabling the apparatus to introduce reinforcement pins into more complex geometries.

The carriage may comprise a nozzle.

The drill module, pin feeder module and tamper module may each be configured to actuate along a common axis through the nozzle.

At least the drill module and the pin feeder module may be movable relative to the carriage to align with the nozzle.

The nozzle may be stationary with respect to the carriage.

The carriage may be translatable relative to the composite preform in three orthogonal directions and rotatable relative to the composite preform about a first axis orthogonal to the common axis. Rotating the carriage relative to the composite preform allows pins to be inserted into the composite preform at an angle, enabling pins to be inserted in more complex geometries as well as being able to insert pins at different angles to improve the overall reinforcement capability of the pins.

The carriage may also be rotatable relative to the composite preform about a second axis orthogonal to the first axis and the common axis. Being able to rotate about two axis allows for additional freedom to direct pins in different directions into the preform.

In some examples the tamper module comprises a tamping rod actuatable through the nozzle along the common axis. In other examples the tamper module comprises a compressed air line connected to the nozzle.

In some examples the drill module and pin feeder module are linearly translatable relative to the common actuation position. In other examples the carriage comprises a rotatable carousel configured to exchange the drill module and pin feeder module between the common actuation position.

The carriage may be mounted for rotation on a support structure that is translatable along at least two orthogonal directions relative to the composite preform.

In accordance with a second aspect there is provided a method of reinforcing a composite preform using the apparatus according to the first aspect, the method comprising the steps of:

i) drilling a hole through the composite preform using the drill module at the common actuation position;

ii) exchanging the drill module for the pin feeder module;

iii) inserting a reinforcement pin through the hole using the pin feeder module at the common actuation position; and iv) tamping the reinforcement pin in the hole using the tamper module at the common actuation position.

The method may further comprise the step of holding the composite preform on a workpiece holder prior to the step of drilling a hole.

In some examples step iii) may be carried out by linearly translating the drill module and pin feeder module. In other examples step iii) is carried out by rotating the drill module and pin feeder module.

In accordance with a further aspect, there is provided an apparatus for reinforcing a composite preform featuring an external surface, the apparatus comprising:

a carriage for introducing reinforcement pins into the composite preform through the external surface, the carriage comprising a drill module, a pin feeder module, a tamper module, and a nozzle, the carriage being rotatable relative to the composite preform, wherein the drill module and pin feeder module are exchangeable between a common actuation position on the carriage.

In some examples the carriage may be rotatable to position the nozzle at an angle to a perpendicular of the external surface of the composite preform. In other words, the carriage may rotate to position the nozzle not perpendicularly to the external surface of the composite preform.

The nozzle may have an actuation axis, and the drill module and pin feeder module each may be configured to actuate along the actuation axis.

The carriage may be rotated to position the actuation axis not perpendicularly to the external surface of the composite preform.

In some examples, the carriage may be rotatable to position the nozzle such that the actuation axis is arranged not perpendicular to the external surface of the composite preform. In such examples, the drill module and pin feeder module each may actuate, along the actuation axis, not perpendicularly to the external surface of the composite preform.

The nozzle may be arranged in correspondence of the common actuation position.

The carriage may be translatable relative to the composite preform.

The skilled person will appreciate that, except where mutually exclusive, a feature described in relation to any one of the above aspects may be applied mutatis mutandis to any other aspect. Furthermore, except where mutually exclusive, any feature described herein may be applied to any aspect and/or combined with any other feature described herein.

DESCRIPTION OF THE DRAWINGS

Embodiments will now be described by way of example only, with reference to the Figures, in which.

DETAILED DESCRIPTION

Figure 1:
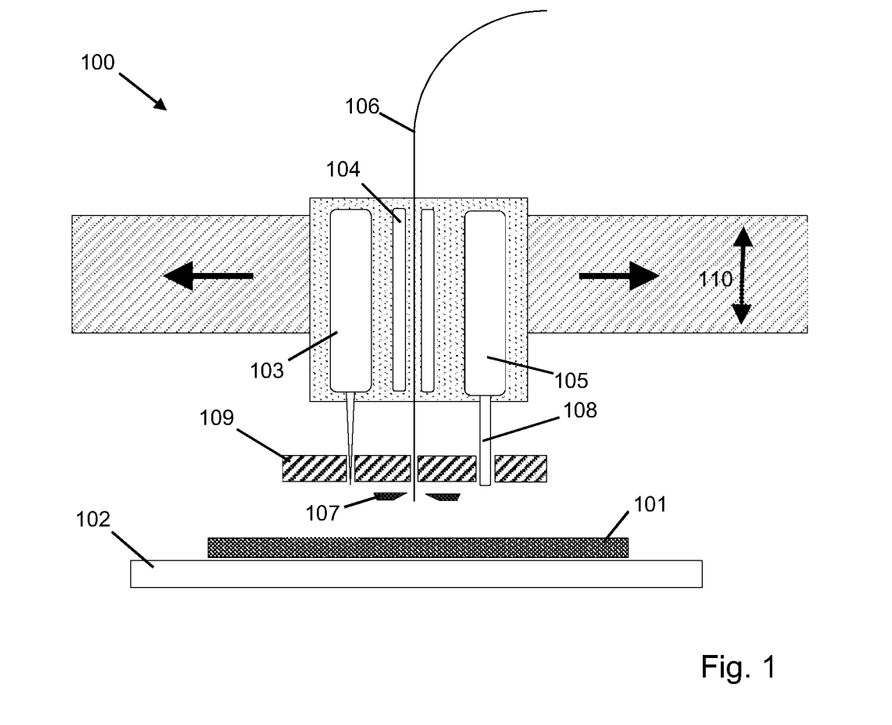
FIG. 1 is a sectional schematic view of an example apparatus for inserting z-pin reinforcement in a composite laminate.

FIG. 1 illustrates an example apparatus 100 for inserting z-pin reinforcements into a composite laminate. The planar composite laminate 101 is mounted horizontally to a workpiece holder 102. The apparatus 100 comprises a drill module 103, a pin feeder module 104 and a tamper module 105, which are all translatable together relative to the composite laminate 101 in three orthogonal directions, i.e. x, y and z directions where x and y directions are in the plane of the laminate 101 and the z direction 110 is orthogonal to the plane of the laminate 101. The apparatus 100 inserts a z-pin reinforcement by carrying out three sequential steps.

In a first step, the drill module 103 is positioned relative to the laminate 101 and a hole is drilled through the laminate 101. The drill module 103 then withdraws from the laminate and the apparatus 100 translates relative to the laminate 101 to align the pin feeder module 104 with the hole in the laminate 101. This translation may occur by moving the apparatus 100 relative to a stationary workpiece holder 102 or alternatively may involve the workpiece holder 102 moving relative to a stationary apparatus 100. In a second step, the pin feeder module 104 feeds a length of rod or wire 106 into the hole. Before withdrawing from the laminate 101, a cutter 107 cuts the rod 106 to leave a predetermined length of rod in the hole to form a pin. The apparatus 100 then translates again in the x-y plane to align the tamper module 105 with the pin in the hole. In a third step, the tamper module actuates a tamper 108 to drive the pin further into the hole. The process then moves on to insert a further z-pin reinforcement in the laminate 101. In a typical laminate, a large number of pins may be inserted in this way, depending on the degree of reinforcement required. A typical required pin areal density would be around 2%, based on a physical spacing of pins of around 1.75 mm, requiring many hundreds or thousands of pins to be inserted into a panel of a typical size.

In the example apparatus 100 of FIG. 1, the apparatus comprises a footplate 109 through which the drill module 103, pin feeder module 104 and tamper module 105 access the laminate 101. The footplate 109 maintains alignment of each module relative to the laminate, but restricts the apparatus to inserting z-pins in a direction orthogonal to the plane of the laminate. This prevents the apparatus from being able to insert z-pins in locations that may be more restricted than in a planar laminate, for example if the laminate has a more complex geometry including internal radii.

Figure 2:
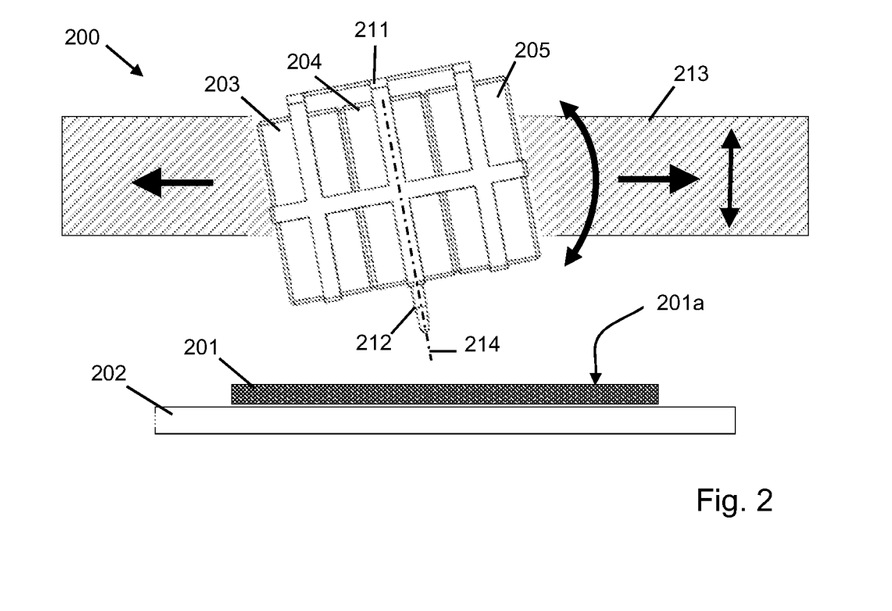
FIG. 2 is a sectional schematic view of an example apparatus for inserting z-pin reinforcement in a composite laminate.

FIG. 2 illustrates an example apparatus 200 aimed at addressing the above mentioned problem of inserting z-pins in more restricted locations in a laminate. The apparatus 200 has the capability to insert pins at an angle into curved or planar laminate preforms using interchangeable modules 203, 204, 205 within a moveable carriage 211 mounted to a support structure 213 such as a gantry, each module accessing the laminate 201 via a common nozzle 212. The illustrated example shows a planar composite preform 201 with an external surface 201a held horizontally for simplicity. Other arrangements are also possible, for example where the composite preform 201 is held at an angle or if the preform is of a more complex shape with curved surfaces or non-uniform sections.

As well as being translatable relative to the laminate 201 and workpiece holder 202 in the x, y and z directions, the carriage 211 is also rotatable about an axis that is parallel to the x-y plane. This allows the apparatus 200 to insert z-pins into the laminate 201 through the external surface 201a at an angle to the perpendicular, rather than only along the z direction. The carriage 211 contains the drill module 203, pin feeder module 204 and tamper module 205, which are interchangeable between a common actuation position, so that each module can access the laminate 201 via a common nozzle 212 along an actuation axis 214. This arrangement allows pins to be delivered through a common location with the smaller footprint that allows for rotation of the carriage relative to the laminate 201. The laminate may additionally or alternatively rotate relative to the carriage 211 to align the actuation axis 214 at an angle relative to the laminate 201.

In the example shown, the nozzle 212 is translatable and rotatable relative to the laminate 201 along with the carriage 211. As the carriage 211 translates and/or rotates, the nozzle 212 and the actuation axis 214 translate in the three orthogonal x, y and z directions and/or rotate about the axis that is parallel to the x-y plane, accordingly.

The nozzle 212 may comprise a chamfered end to allow delivery of a pin at an angle while maintaining proximity to the laminate surface, allowing closer access to portions of the laminate 201 having an internal radius.

A mechanism in the carriage 211 allows the modules 203, 204, 205 to be moved to and from the common actuation position either by translation or rotation. In the example shown in FIG. 2, the modules may translate along a linear axis to move to and from the common actuation position to access the laminate 201 via the common nozzle 212. An actuator (not shown) and locating pins (not shown) may be used to respectively actuate and ensure accurate positional control of the modules 203, 204, 205.

Figure 3A:
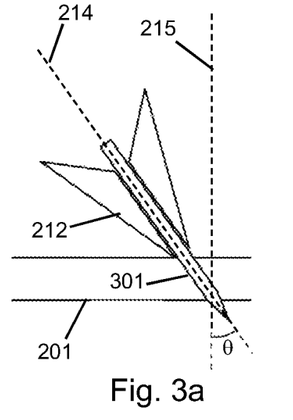
FIGS. 3a, 3b and 3c illustrate schematically a three-step process for inserting a pin into a composite laminate.
Figure 3B:
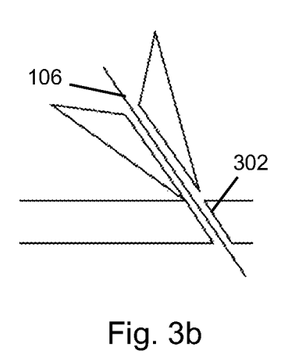
Figure 3C:
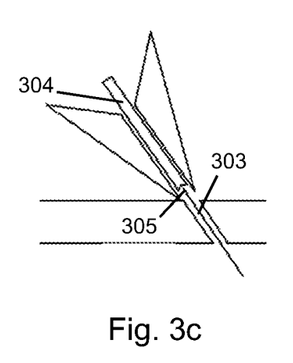

FIGS. 3a, 3b and 3c illustrate a sequence of operations involving drilling, delivery of pin feedstock and tamping to insert a reinforcement pin into a laminate. In a first step (FIG. 3a), the nozzle 212 is positioned at the surface of the laminate 201 with the actuation axis 214 at an angle θ to the perpendicular 215. With the drill module 203 aligned with the nozzle 212, a drill 301 drills a hole through the laminate 201. The drill 301 is then withdrawn and the drill module 203 interchanged with the pin feeder module 204. As shown in FIG. 3b, the pin feeder module 204 feeds a length of rod or wire 106 through the hole 302 formed by the drill 301. The width of the rod 106 is not shown to scale relative to the hole in FIG. 3a; in practice, the rod 106 may be of a similar width to the diameter of the hole 302 so that a sliding or interference fit is formed between the rod 106 and the hole 302 to ensure that the resulting pin stays in position.

Following insertion of the feedstock rod 106 into the hole 302, the rod 106 is cut to leave a predetermined length of rod in the hole 302, forming a pin 303. The pin feeder module 204 is withdrawn and interchanged with the tamper module 205. As shown in FIG. 3c, the tamper module pushes a tamping rod 304 through the nozzle 212, contacting the cut end 305 of the pin 303 and forcing the pin 303 into the hole 302 in the laminate 201, thereby forming a z-pin reinforcement in the laminate 201.

Figure 4:
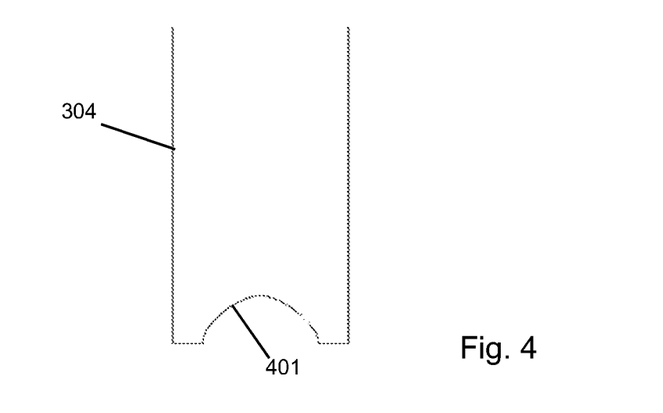
FIG. 4 is a schematic sectional view of an example tamping rod for inserting a z-pin reinforcement into a composite laminate.

The tamping rod 304 preferably has an end that has a concave shaped recess 401 in an end that contacts the pin 303, which serves to locate the pin 303 on the end of the tamping rod 304, as shown in cross-section in FIG. 4.

Figure 5A:
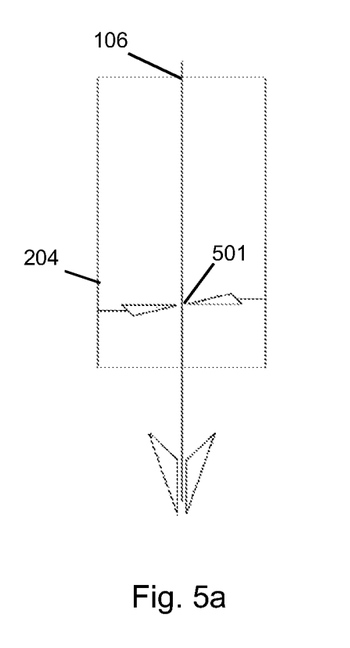
FIGS. 5a and 5b illustrate schematically two different possible positions for a feedstock rod to be cut.
Figure 5B:
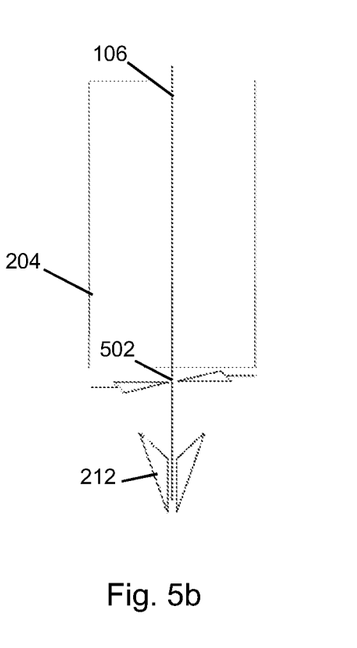

FIGS. 5a and 5b illustrate two alternative ways of cutting the feedstock rod 106 after inserting into the hole 302 formed by the drill 301. In FIG. 5a, the rod 106 is cut at a position 501 within the feedstock module 204, whereas in FIG. 5b the rod 106 is cut at a position 502 between an end of the feedstock module 204 and the nozzle 212. Cutting close to the surface of the laminate, as in FIG. 5b, is currently used for conventional perpendicular z-pin reinforcements.

Figure 6:
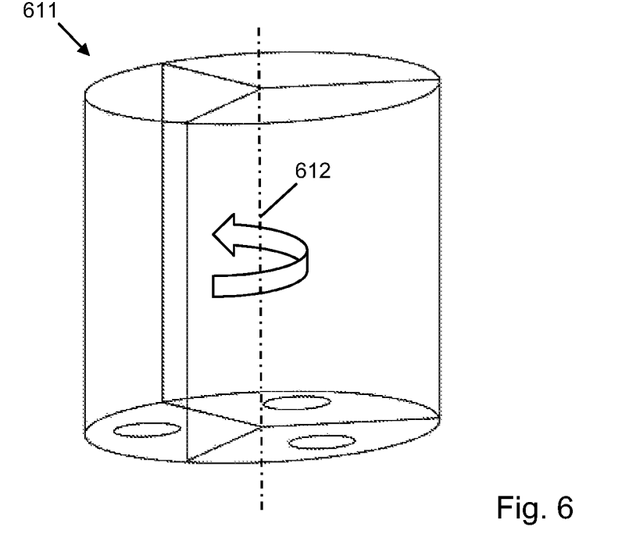
FIG. 6 is a schematic diagram of a rotatable carousel.

In an alternative example, illustrated schematically in FIG. 6, the carriage may comprise a rotatable carousel 611 configured to exchange the drill module, pin feeder module and tamper module between the common actuation position. Rotation of the carousel about a rotation axis 612 allows the modules to be switched to and from the common actuation position. This arrangement may provide a more compact mechanism to interchange the different modules.

Figure 7:
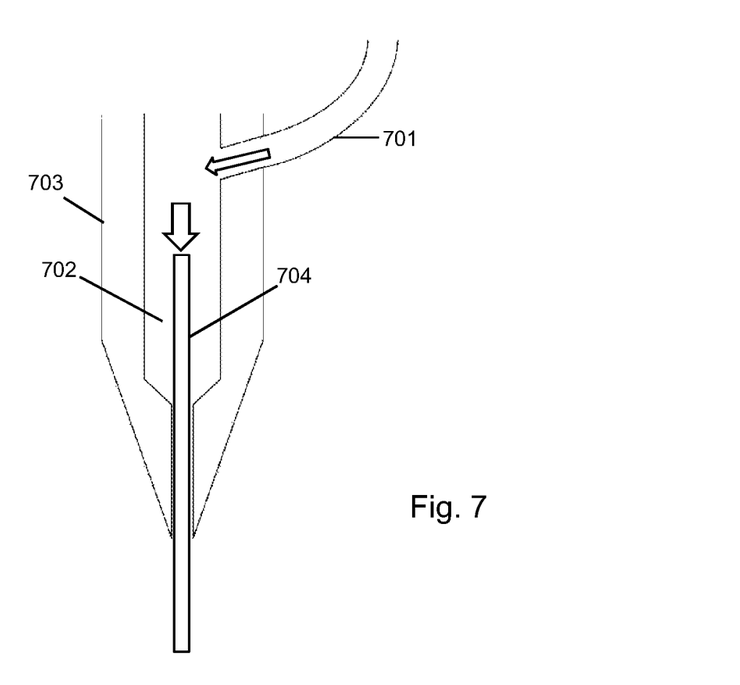
FIG. 7 is a schematic cross-sectional diagram of an alternative tamper module.

In the examples described above, a tamper module with a tamper rod is provided, which is interchangeable with the drill module and pin feeder module. In alternative examples, the tamper module may be provided instead by a compressed air line acting through the nozzle, as shown in schematic cross-section in FIG. 7. The compressed air line 701 provides a controllable supply of compressed air to an internal passage 702 in the nozzle 703, which can be used to apply a force to a pin 704 within the nozzle 703, thereby forcing the pin 704 into the laminate. In this example the tamper module need not be moveable, as the other modules can actuate through the nozzle without interfering with the compressed air line 701. An advantage of this arrangement is that one of the modules is effectively removed, simplifying the apparatus and making it more compact.

Figure 8:
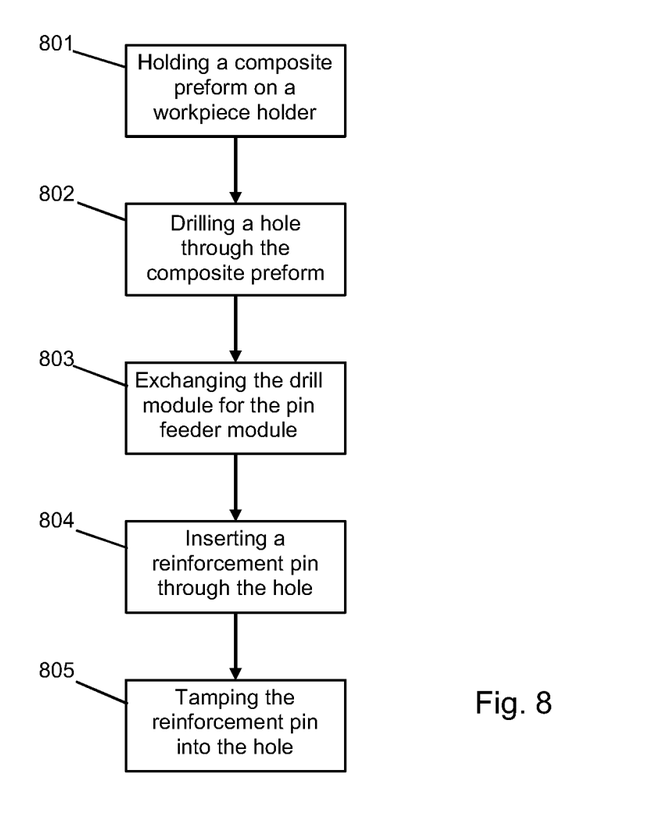
FIG. 8 is a schematic flow diagram illustrating an example method of inserting a reinforcement pin into a composite laminate.

FIG. 8 is a schematic flow diagram illustrating an example method of reinforcing a composite preform using the apparatus as described above. In a first step 801, a composite preform is held on a workpiece holder. This first step may be omitted in cases where a workpiece holder is not required, for example where the composite preform is large and does not require additional support. In a second step 802, a hole is drilled through the composite preform using the drill module at the common actuation position. In a third step 803, the drill module is exchanged for the pin feeder module, either by linearly actuating or rotating the drill and pin feeder modules. In a fourth step 804, a reinforcement pin is inserted through the hole formed by the drill module at the common actuation position. Finally, in a fifth step 805, the reinforcement pin is tamped into the hole using the tamper module at the common actuation position.

In the examples where a separate tamper module is provided, an additional step between steps 804 and 805 may be added to exchange the pin feeder module for the tamper module. In alternative examples, the tamper module may be provided by a compressed air line and an exchange is therefore not required.

It will be understood that the invention is not limited to the embodiments above-described and various modifications and improvements can be made without departing from the concepts herein. Except where mutually exclusive, any of the features may be employed separately or in combination with any other features and the disclosure extends to and includes all combinations and sub-combinations of one or more features described herein.

We claim:

1. An apparatus for reinforcing a composite preform, comprising:
 a carriage for introducing reinforcement pins into the composite preform, the carriage comprising a drill module, a pin feeder module and a tamper module, the carriage being translatable relative to the composite preform,
 wherein the drill module and pin feeder module are exchangeable between a common actuation position on the carriage.

2. The apparatus of claim 1, comprising a workpiece holder for holding the composite preform.

3. The apparatus of claim 1, wherein the carriage comprises a nozzle, the drill module, pin feeder module and tamper module each being configured to actuate along a common axis through the nozzle.

4. The apparatus of claim 3, wherein the carriage is translatable relative to the composite preform in three orthogonal directions and is rotatable relative to the composite preform about a first axis orthogonal to the common axis.

5. The apparatus of claim 4, wherein the carriage is rotatable relative to the composite preform about a second axis orthogonal to the first axis and the common axis.

6. The apparatus of claim 3, wherein the tamper module comprises a tamping rod actuatable through the nozzle along the common axis.

7. The apparatus of claim 3, wherein the tamper module comprises a compressed air line connected to the nozzle.

8. The apparatus of claim 1, wherein the drill module and pin feeder module are linearly translatable relative to the common actuation position.

9. The apparatus of claim 1, wherein the carriage comprises a rotatable carousel configured to exchange the drill module and pin feeder module between the common actuation position.

10. The apparatus of claim 1, wherein the carriage is mounted for rotation on a support structure, the support structure being translatable along at least two orthogonal directions relative to the composite preform.

11. A method of reinforcing a composite preform using the apparatus according to claim 1, the method comprising the steps of:
 i) drilling a hole through the composite preform using the drill module at the common actuation position;

ii) exchanging the drill module for the pin feeder module;

iii) inserting a reinforcement pin through the hole using the pin feeder module at the common actuation position; and iv) tamping the reinforcement pin in the hole using the tamper module at the common actuation position.

12. The method of claim 11, wherein step ii) is carried out by linearly translating the drill module and pin feeder module.

13. The method of claim 11, wherein step ii) is carried out by rotating the drill module and pin feeder module.

14. The method of claim 11 comprising the step of holding the composite preform on a workpiece holder prior to the step of drilling a hole.

15. An apparatus for reinforcing a composite preform featuring an external surface, the apparatus comprising:

a carriage for introducing reinforcement pins into the composite preform through the external surface, the carriage comprising a drill module, a pin feeder module, a tamper module, and a nozzle, the carriage being rotatable relative to the composite preform, wherein the drill module and pin feeder module are exchangeable between a common actuation position on the carriage.

16. The apparatus of claim 15, wherein the carriage is rotatable to position the nozzle at an angle to a perpendicular of the external surface of the composite preform.

17. The apparatus of claim 15, wherein the nozzle is arranged in correspondence of the common actuation position.

18. The apparatus of claim 15, wherein the nozzle has an actuation axis, the drill module and pin feeder module each being configured to actuate along the actuation axis.

19. The apparatus of claim 18, wherein the carriage is rotated to position the nozzle such that the actuation axis is arranged not perpendicularly to the external surface of the composite preform.

* * * * *